United States Patent [19]
Shiraki et al.

[11] Patent Number: 5,793,133
[45] Date of Patent: Aug. 11, 1998

[54] FLAT VIBRATION GENERATING APPARATUS

[75] Inventors: Manabu Shiraki; Osami Miyao; Yasunobu Hiratsuka; Soota Komiya, all of Kanagawa, Japan

[73] Assignee: Shicoh Engineering Co., Ltd., Kanagawa, Japan

[21] Appl. No.: 527,830

[22] Filed: Sep. 13, 1995

[30] Foreign Application Priority Data

Sep. 16, 1994 [JP] Japan ................ 6-248611

[51] Int. Cl.$^6$ ........................................ H02K 7/075
[52] U.S. Cl. .................. 310/81; 310/40 MM; 310/193; 310/179; 310/198; 310/237; 310/268; 310/208
[58] Field of Search .............. 310/81, 268, 40 MM, 310/237, 208, 193, 179, 198, 154; 340/311.1

[56] References Cited

U.S. PATENT DOCUMENTS

| | | | |
|---|---|---|---|
| 4,568,847 | 2/1986 | Schmider | 310/268 |
| 4,583,016 | 4/1986 | Ban et al. | 310/198 |
| 4,864,276 | 9/1989 | Tribbey et al. | 340/407 |
| 5,036,239 | 7/1991 | Yamaguchi | 310/268 |

FOREIGN PATENT DOCUMENTS

| | | | |
|---|---|---|---|
| 88060 | 6/1988 | Japan | 310/81 |
| 105459 | 7/1988 | Japan | 310/81 |
| 105460 | 7/1988 | Japan | 310/81 |
| 290140 | 11/1988 | Japan | 310/81 |
| 290141 | 11/1988 | Japan | 310/81 |
| 290153 | 11/1988 | Japan | 310/81 |
| 129744 | 5/1989 | Japan | 310/81 |
| 17843 | 1/1990 | Japan | 310/81 |
| 17853 | 1/1990 | Japan | 310/81 |
| 33573 | 2/1990 | Japan | 310/81 |

*Primary Examiner*—Thomas M. Dougherty
*Assistant Examiner*—Karl Eizo Tamai
*Attorney, Agent, or Firm*—Nilles & Nilles, S.C.

[57] ABSTRACT

A flat vibration generating apparatus wherein a flat coreless eccentric vibrator armature generates an eccentric vibration desired from the aspect of body feel. An air-core armature coil group thereof consists of m pieces (where m is an integer of 3 or more) of armature coils disposed in superposition with one another in m phases in an arrangement such that they are eccentric and with their phases deviated in a circumferential direction, and that they do not describe a complete disc-like shape as viewed from the axial direction.

8 Claims, 6 Drawing Sheets

FLAT VIBRATION GENERATING APPARATUS

BACKGROUND OF THE INVENTION

1. Field of the Invention

This invention relates to a flat vibration generating apparatus suitable for a calling device which transmits a call by vibration in a small wireless device such as a pager, a signal receiver for the auditorily handicapped, a device for transmitting a predetermined signal, a massaging device capable of imparting mild vibration to the human body, etc. and requiring a massaging effect or mild vibration, and so forth.

2. Description of the Prior Art

Among the devices of this kind for generating vibration, a pager is a typical example as a calling device for a small wireless transmitter, and the pager has been particularly wide spread. Therefore, the following explanation will be given primarily on the pager.

To notify the user of the pager of a telephone call, the pager generates an alarm sound by its internal sound generation device when its internal receiver receives a wireless call signal.

However, because the calling signal of the alarm sound by the sound generation device beeps irrespective of the place, the sound exerts offensive influences on the environment, or the alarm sound cannot be heard and hence, the telephone call cannot be recognized in an environment where the surrounding noise is great.

To cope with this problem,the latest model of pagers generates an alarm signal by vibration in addition to the call signal by sound and can arbitrarily select either one of these alarm signals.

A typical example of the vibration generating apparatus for the pager of this kind will be explained.

In the conventional vibration generating apparatus for a pager, an eccentric vibration weight made of an expensive metal having a high specific gravity such as tungsten is fitted by an adhesive or clamping means to a rotary shaft protruding from an end face of a cylindrical coreless motor of a radial air-gap type. Since the eccentric vibration weight undergoes eccentric rotary motion and eccentric vibration, its shape as viewed from the direction of the axis of rotary shaft is semicircular or fan shape but not a regular disc-like shape.

Such a vibration generating apparatus using the cylindrical coreless motor is fixed inside the pager main body, and, when the motor is rotated, the eccentric vibration weight undergoes eccentric rotary motion. The vibration generated at this time by the centrifugal force propagates to the pager main body. Therefore, this vibration propagates to the user bearing the pager and can notify the user of the telephone call.

The vibration generating apparatus in the pager primarily employs the structure described above, but is not free from several problems yet to be solved. First, the rotary shaft protrudes from the end face of the cylindrical coreless motor, and the expensive eccentric vibration weight must be fitted to the rotary shaft. Therefore, the product becomes extremely expensive. To obtain great vibration, the eccentric vibration weight must use an alloy having a high specific gravity as typified by tungsten, which is very expensive. The production step of fitting the eccentric vibration weight to the rotary shaft is also necessary, and quality control to check whether or not the eccentric vibration weight falls off from the rotary shaft needs a great deal of time and labor. As a result, the vibration generating apparatus using the cylindrical coreless motor becomes eventually very expensive.

The cylindrical coreless motor conventionally constituting the vibration generating apparatus has a diameter as great as 10 mm. Recently, however an extremely small coreless motor having a diameter of 6 or 7 mm is available. However, the production of such a small coreless motor is very troublesome, the production yield is very low and quality inspection needs a long time. After all, the product becomes extremely expensive. Incidentally, in the cylindrical coreless motor having a diameter of 6 or 7 mm, the reduction of the outer size by only 1 mm causes the manufacture to become extremely difficult.

In the pagers of the latest type, the importance of design has been increasing, and small card type pagers having the size of a name card have been provided or a wrist watch has been provided with the pager function.

Because such card type pagers or wrist watch type pagers are very thin, there is no space left to incorporate the vibration generating apparatus using the conventional cylindrical coreless motor. Therefore, these pagers use a piezoelectric buzzer, etc. so as to provide the call function by sound generation.

However, when the sound generation device is used to attain the call function, the problems with the prior art devices remain unsolved, even though the design of the pagers is taken into consideration.

The co-inventors of the present invention, i.e. Shiraki, Miyao and one other, proposed a flat vibration generating apparatus of the type wherein a rotor itself functions as the vibration weight, by forming the rotor into a semi-circular disc shape in Japanese Patent Laid-Open Nos. 290141/1988, 290153/1988 and 129744/1989. This is the first of the practical flat vibration generating apparatus in the pager.

Prior to these patent applications, Shiraki, Miyao et al filed several patent applications (e.g. Japanese Patent Laid-Open No. 290140/1988, Japanese Utility Model Laid-Open Nos. 88060/1988, 105459/1988, 105460/1988, etc.) and other companies subsequently filed similar applications. In other words, a weight for generating vibration is fitted to a predetermined position of a coreless flat armature, which is disc-like and functions as a rotor, in an axial air-gap type motor having four flat magnetic field poles and three coils of three-phase, or as disclosed in U.S. Pat. No. 4,864,276 (corresponding to Japanese Patent Laid-Open No. 17843/1990) or Japanese Patent Laid-Open No. 17853/1990, the winding specification and the shape of a specific armature coil itself of a coreless flat armature are changed so as to reduce the weight. Namely, these prior art devices cause loss of the balance of rotation of the coreless armature and eventually obtains the intended vibration.

In the flat vibration generating apparatus described above wherein the weight is fitted to the rotor or the winding specification and the shape of the specific armature coil is changed, the desired vibration can be obtained by increasing the size. However, the flat vibration generating apparatus cannot be adapted to the latest pagers having a ultra-small thickness and a light weight such as the card type and name card type pagers.

Accordingly, the co-inventors of the present invention, i.e. Shiraki, Miyao and one other disclosed a flat vibration generating apparatus wherein a rotor itself functions as a vibration weight by shaping the rotor itself into a semicircular shape as viewed from the top, in Japanese Patent Laid-Open Nos. 290141/1988, 290153/1988, 129744/1989, etc. and succeeded in obtaining practically sufficient characteristics. At the time of the filing dates of these patent applications, however, mass-production plan of a useful flat vibration generating apparatus and a cylindrical vibration generating apparatus useful for the pagers was not established.

Accordingly, the right of production and sale of the vibration generating apparatus suitable for the pager described above was assigned to Tokyo Parts Kogyo Kabushiki Kaisha having a cooperative relationship with the inventors (some of the patent applications were subsequently changed to co-applications) so that the company could start mass production. Thereafter, Tokyo Parts Kogyo Kabushiki Kaisha made further improvements and filed a patent application for flat vibration generating apparatus (Japanese Utility Model Laid-Open No. 33573/1990), the U.S. application corresponding to *** which was granted as U.S. Pat. No. 5,036,239.

According to the flat vibration generating apparatus of the U.S. Pat. No. 5,036,239 described above, the thickness of the vibration generating apparatus is 3 mm in an axial direction, and its diameter is 20 mm. Therefore, a compact and flat vibration generating apparatus has been marketed for the first time, and this vibration generating apparatus is suitable for the card type, the name card type, the wrist watch type and other types of pagers. Moreover, the vibration generating apparatus is economical.

When adapted to the card type pager, for example, such a flat vibration generating apparatus is extremely useful because the pager can be put into a breast pocket of a shirt, etc.

However, because the flat vibration generating apparatus of the U.S. Pat. No. 5,036,239 employs the structure shown in FIGS. 9 to 11, it cannot provide sufficiently large vibration and involves several problems yet to be solved.

Figure 9:
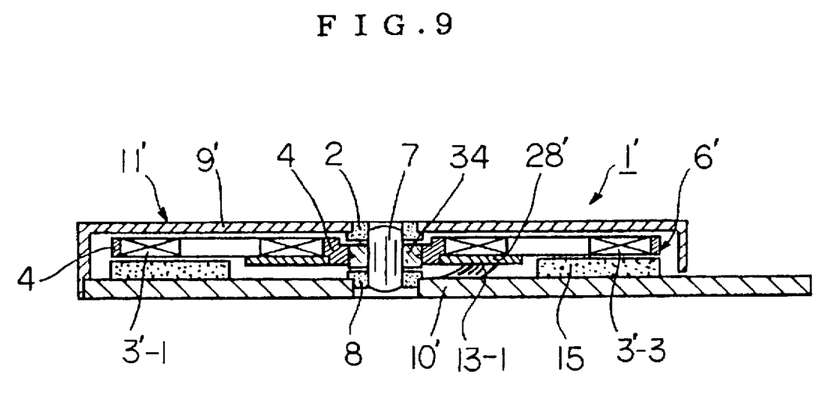
FIG. 9 is a vertical sectional view of a conventional flat vibration generating apparatus, labeled "Prior Art".

Next, this conventional vibration generating apparatus will be explained. In the flat vibration generating apparatus 1', a main body 11' is defined by closing the opening at the lower end portion of a flat cup-like case 9' by a bracket 10'. A through-hole for receiving a rotary shaft 7 therethrough is formed at a substantial center of each of the case 9' and the bracket 10'. Oilless metal bearings 2, 8 are fitted into the through-hole so as to rotatably support the rotary shaft 7. Four flat magnetic field poles 15 made of a known rare earth magnet are fixed to the surface of the bracket 10' in the same way as in FIG. 1, and a pair of brushes (only one brush 13-1 being depicted in the drawing) coming into sliding contact with a commutator 28' are disposed at the inner peripheral positions of the field poles 15.

Figure 10:
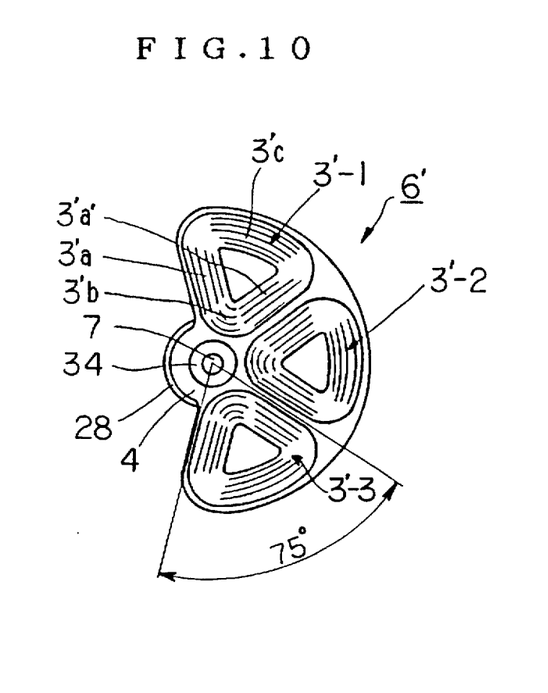
FIG. 10 is a plane view of an armature of the conventional flat vibration generating apparatus, labeled "Prior Art".
Figure 11:
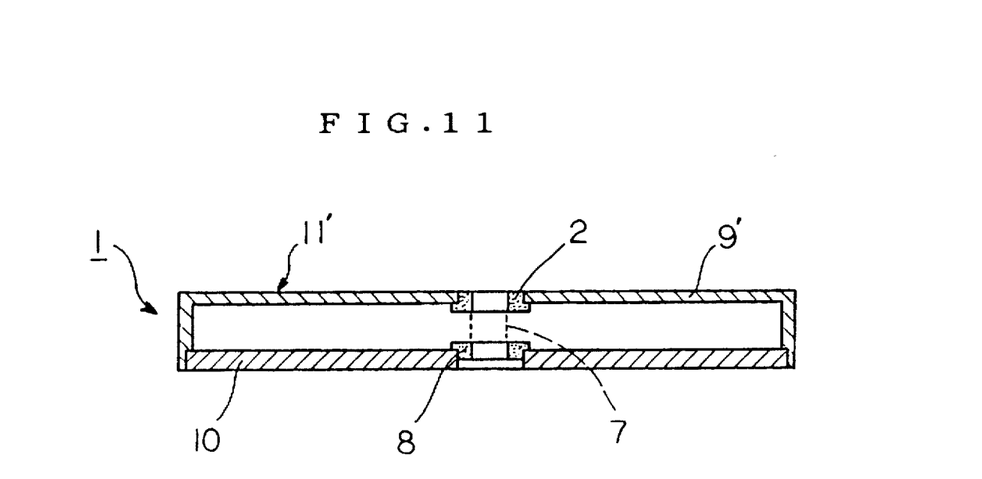
FIG. 11 is a vertical cross sectional view of a case in the conventional flat vibration generating apparatus, labeled "Prior Art".

A rotor holder 34 is pressed into the rotary shaft 7, and a flat coreless eccentric vibrator armature 6', rotated eccentrically by centrifugal force, is fitted over the outer periphery of the rotor holder 34 as shown in FIG. 10 so that it rotates integrally with the rotary shaft 7.

In the case of the flat coreless eccentric vibrator armature 6' shown in FIG. 10, three armature coils 3'-1, 3'-2, 3'-3 of three-phase are disposed at a pitch angle of 75° and deviated to one side and are molded by a resin 4 into a flat eccentric shape. Four flat magnetic field poles 15 are disposed facing the surface of the armature 6'.

In each of the armature coils 3'-1, 3'-2 and 3'-3, the angle between effective conductor portions 3'a and 3'a', which extend in the radial direction and contribute to the resulting torque, is set to about 75°. Incidentally, conductor portions 3+b, 3'c in the peripheral direction are those portions which do not contribute to the resulting torque.

According to the flat vibration generating apparatus 1' described above, a button cell type can be obtained.

In the flat vibration generating apparatus 1' shown in FIG. 9, the rotary shaft 7 is rotatably supported by the bearings 2 and 8 disposed on the case 9' and the bracket 10', respectively. However, a gap exists between the upper portion of the case 9' and the lower portion of the bracket 10'. Therefore, when the two bearings 2 and 8 are fitted to the case 9' and the bracket 10', errors in concentricity and coaxiality occur besides the fitting error when the bracket 10' is fitted to the case 9' by pressing, etc. Therefore, when the rotary shaft 7 is fitted, it may be tilted, and a sizing operation becomes necessary to correct the attitude of the rotary shaft 7, or disconnection may occur in the coil of the flat coreless eccentric vibrator armature 6'. Further, great frictional noise is likely to occur, great vibration cannot be obtained, a current value increases, large vibration cannot be obtained, and the product quality may vary. In addition to these problems, a flat vibration generating apparatus which is thinner in the axial direction cannot be obtained because two bearings 2 and 8 are used.

Next, a case where the flat vibration generating apparatus 1' of this kind is used for the pager will be explained. In the case of the card type pager, the front or the back surface of the pager comes into contact with the human body when the pager is put into the breast pocket. In this case, the front or the back surface of the flat vibration generating apparatus 1' is disposed in parallel with the front or the back surface of the pager. As a result, the centrifugal force of the flat vibration generating apparatus 1' generating vibration in the radial direction due to the centrifugal force during rotation is applied to the side surface direction of the pager but is not directly imparted to the direction of the human body. In other words, since the rotary shaft has an orthogonal relationship with respect to the case of the pager, the vibration is generated in a direction in parallel with the case of the pager by the centrifugal force when the rotor of the flat vibration generating apparatus 1' rotates.

In order for the user bearing the pager to recognize the vibration of the flat vibration generating apparatus 1', desirable body feel vibration can be felt if vibration acts in a direction which pushes the surface of the case of the pager in the orthogonal direction, that is, in the orthogonal direction to the case of the pager. In other words, when the rotor rotates, it is desired that the flat vibration generating apparatus 1' generates vibration in the direction of the rotary axis (hereinafter called "vertical direction") in addition to the vibration in a direction in parallel with the surface thereof due to the centrifugal force, and in this case, the desirable vibration from the aspect of body feel can be generated. However, the flat vibration generating apparatus 1' described above cannot generate such vertical vibration. In the case of the cylindrical vibration generating apparatus, the eccentric vibration weight is fitted to the rotary shaft of the cylindrical motor, and such a cylindrical vibration generating apparatus is disposed in the lying posture to the case of the pager. Accordingly, when the eccentric weight rotates, vibration due to the centrifugal force of this weight occurs in a direction which pushes the surface of the case of the pager in the orthogonal direction. Therefore, the desired body feel vibration can be generated.

Therefore, it is desired from aspect of the body feel in the case of the flat vibration generating apparatus 1', too, that vertical vibration be generated in the flat coreless vibrator armature 6' in the same way as in the cylindrical vibration generating apparatus. Nonetheless, such vertical vibration cannot be generated in the flat vibration generating apparatus 1' using the flat coreless eccentric vibrator armature 6' as the rotor.

Because vertical vibration cannot be generated, the flat vibration generating apparatus must be designed so that the greatest possible vibration can be obtained, but there is the limitation that the size cannot be increased. Furthermore, the price, efficiency, inspection and maintenance, and other specification must be satisfied.

In order to obtain the greatest possible vibration under the given condition, the flat vibration generating apparatus 1' described above employs the three-phase motor having improved efficiency by using three armature coils 3'-1, 3'-2 and 3'-3 so disposed as not to overlap with one another.

However, in the flat vibration generating apparatus 1', four magnetic field poles 15 are used, whereas armature coils 3'-1, 3'-2 and 3'-3 are used, a pitch angle between the effective conductor portions 3'a and 3'a' being set to about 75° which is smaller than the angular interval of the magnetic field poles 15. Therefore, as is obvious from the Fleming's left-hand rule, reverse torque acts, so that the efficiency is low and vibration greater than expected cannot be obtained.

Further, because the flat vibration generating apparatus 1' described above uses the rotary shaft 7, errors occur in concentricity and coaxiality, and the sizing work to correct these errors becomes necessary. Further, disconnection occurs in the coil of the flat coreless eccentric vibrator armature 6', a great frictional noise occurs, great vibration cannot be obtained, a current value increases, and variance occurs in product quality. These problems impede mass production.

SUMMARY OF THE INVENTION

It is an object of the present invention to solve the problems with the conventional flat vibration generating apparatus 1' described above. Specifically, the present invention provides greater vibration force by employing a flat motor structure having higher design freedom and higher efficiency so as to solve the structural problems with the flat motor structure not capable of originally providing the vertical vibration and thus to cover insufficiency of the vertical vibration, and makes it possible to add an eccentric weight capable of providing the vertical vibration. As a result, the present invention provides a flat vibration generating apparatus which is really practical in all the aspects of the price, the functions, the structure, etc, and can moreover generate the vertical vibration desired from the aspect of body feel.

In the present invention, the object described above for solving insufficient vertical vibration by improving efficiency and obtaining greater vibration can be accomplished by a flat vibration generating apparatus of an axial air-gap type comprising a stator having N and S magnetic field poles of 2 P (where P is an integer of 1 or more) disposed in such a manner that adjacent poles have different polarities, brushes, a flat coreless eccentric vibrator armature consisting of an air-core armature coil group facing the magnetic field poles through a gap in the axial direction and rotating eccentrically, and a commutator electrically connected to the armature, characterized in that the armature coil group consists of m pieces (where m is an integer of 3 or more) of armature coils disposed in superposition with one another in m phases in an arrangement such that they are eccentric and mass-eccentric and with their phases deviated in a circumferential direction, and they describe a semicircular shape as viewed from the axial direction.

In a more concrete example of such a flat vibration generating apparatus of the present invention four magnetic field poles and a three-phase flat coreless eccentric vibrator armature of the type wherein three air-core type armature coils are mutually superposed double in such a manner that their phases are deviated from one another in the circumferential direction so as to form the three-phase arrangement, and in the eccentric and mass-eccentric arrangement so that they do not described a complete disc-like shape as viewed from the axial direction, these magnetic field poles and the three-phase flat coreless eccentric vibrator armature being so disposed as to oppose one another on their surfaces through the gap in the axial direction.

In the present invention, further, in order to obtain the vertical vibration in the flat vibration generating apparatus having higher efficiency and higher design freedom as described above, an eccentric weight for generating an eddy current by its rotation relative to the magnetic field poles is disposed inside a frame of the armature coil at the center among the armature coils.

Further, to improve performance and efficiency of the flat vibration generating apparatus in the present invention, the commutator is formed of six commutator plates, two of said brushes coming into sliding contact with the commutator plates and electrically connected to the positive and negative power supply terminals are disposed at an angle having a 2 w/k (where w is and angle occupied by two magnetic field poles), and each of said air-core type armature coils is formed in such a manner that the pitch angle between two conductor portions extending in the radial direction and contributing to the torque generation is equal to the 2 P/k or substantially equal to the angular interval of the magnetic field poles.

Further, in one method of easily producing the flat vibration generating apparatus described above, a winding start terminal inside the armature coil on the remote side having a larger distance from the magnetic field pole in the axial direction is connected electrically to the commutator plates by directly passing through the one near side having a shorter distance from the magnetic field pole in the axial direction.

To produce economically and easily the bearing mechanism having high mass producibility and stable quality, a flat vibrator main body is formed by closing the open end portion of a cup-shaped case by a bracket, a through-hole is bored at the substantial center of the bracket, a stationary shaft is planted to this through-hole, the apex of the stationary shaft is brought into contact with a slider disposed on the inner surface of the case, and the flat coreless vibrator armature for generating the vibration by the centrifugal force when it rotates round the outer periphery of the stationary shaft, is disposed rotatably inside the flat vibrator main body.

A current is applied to armature coils 3-1, 3-2 and 3-3 so that a torque in a predetermined direction is generated through the commutator coming into sliding contact with brushes 13-1, 13-2 (brush portions 13*b*, 13*b*') electrically connected to the positive and negative power terminals, and a three-phase flat coreless eccentric vibrator armature 6 undergoes eccentric rotation while exhibiting partial circular motion in the predetermined direction. The centrifugal force formed by the eccentric quantity in both radial and circumferential directions due to the eccentric rotation of this eccentric vibrator armature 6 generates the vibration. Since this vibration propagates to a flat vibrator main body 11, vibration propagates to the device to which this flat vibration generating apparatus 1 is fitted, such as the pager main body, and the user can sense the call from this vibration.

The flat coreless vibrator armature 6 is produced by using the coreless armature coils 3-1, 3-2 and 3-3 each having the structure wherein the open angle between effective conductor portions 3a and 3a' extending in the radial direction and contributing to the resulting torque is set to about 90° which is substantially equal to the angular interval of the magnetic field poles 15.

As is obvious from the Fleming's left-hand rule, the reverse torque is not likely to act on these armature coils 3-1, 3-2 and 3-3. In other words, these armature coils generate a great torque and great vibration.

In this flat coreless eccentric vibrator armature 6, further, the armature coils 3-1 and 3-3 are disposed adjacent to each other in such a manner as not to overlap each other, and the armature coil 3-2 is superposed on (or below) an intermediate portion between these armature coils 3-1 and 3-3. Accordingly, a fan-shaped eccentric weight 5 capable of providing vertical vibration desirable to the body feeling can be buried into the internal frame hollow portion of the armature coil 3-2.

Therefore, when the eccentric weight 5 made of lead is buried into the in-frame hollow portion of the armature coil 3-2 at the center of the flat coreless eccentric vibrator armature 6, this eccentric weight 5 undergoes rotation relative to the N and S poles of the magnetic field poles 15 and generates an eddy current. Since the eccentric weight 5 has the same function as that of the N and S magnetic poles, it undergoes attraction and repulsion to and from the N and S poles, and the flat coreless eccentric vibrator armature 6 undergoes attraction and repulsion to and from the magnetic field poles 15 and rotates while causing vertical vibration. Accordingly, when the flat vibration generating apparatus 1 is disposed on the inner surface of the case of the pager, vibration due to the centrifugal force involving vertical vibration, which is desirable for the body feel, can be imparted to the case of the pager.

According to the flat vibration generating apparatus of the present invention, the flat coreless eccentric vibrator armature revolves round the outer periphery of the stationary shaft. Therefore, the tolerance of fitting between the outer diameter of the stationary shaft and the inner diameter of a bearing provided to the flat coreless eccentric vibrator armature rotating round this outer periphery can be mitigated. In other words, even when the tolerance of fitting between the outer diameter of the stationary shaft and the inner diameter of the bearing does not coincide with a predetermined value, the flat coreless eccentric vibrator armature can rotate round the outer periphery of the stationary shaft while exhibiting eccentric vibration.

DESCRIPTION OF THE PREFERRED EMBODIMENT

Figure 1:
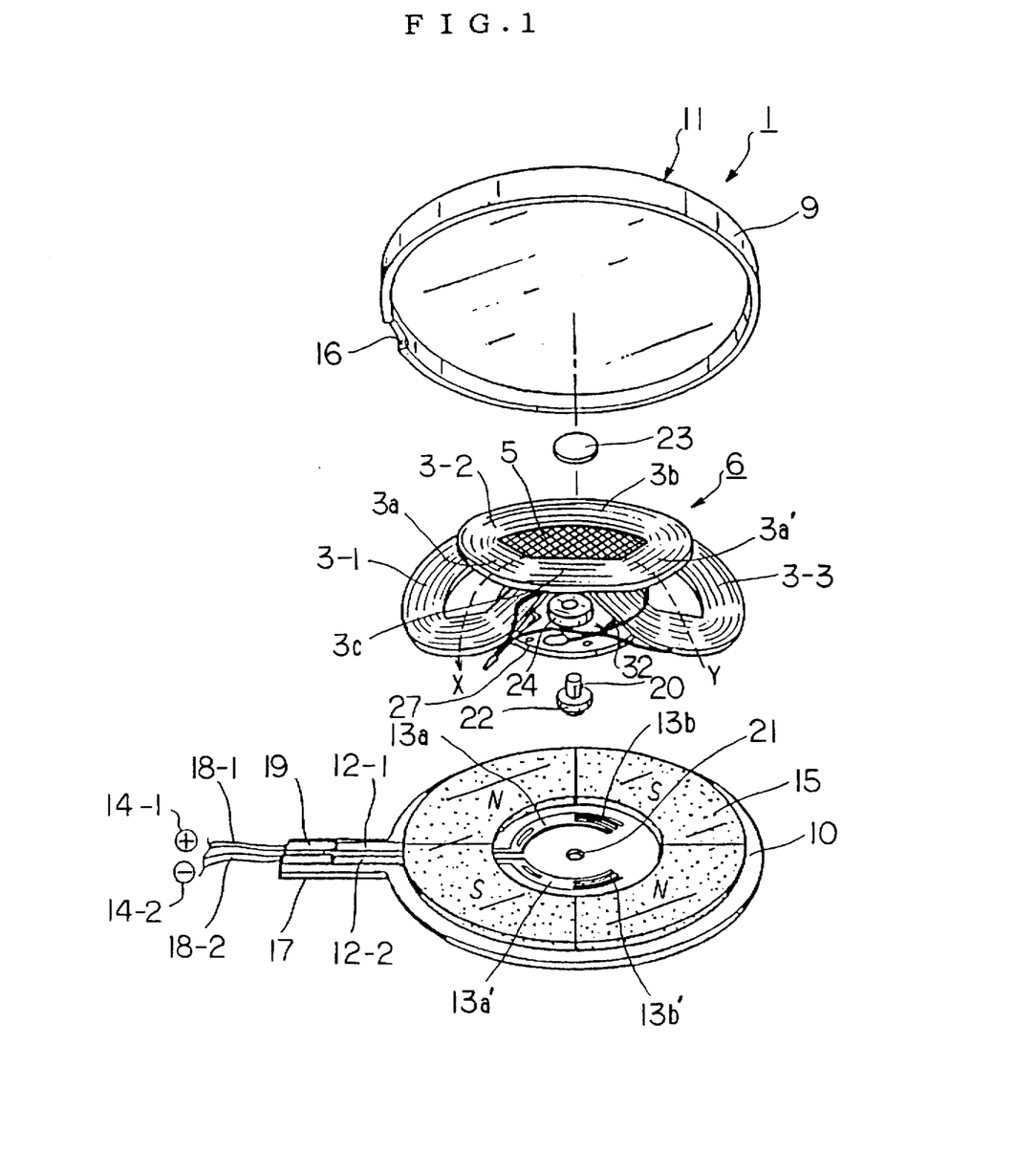
FIG. 1 is an exploded perspective view of a flat vibration generating apparatus according to the present invention.
Figure 2:
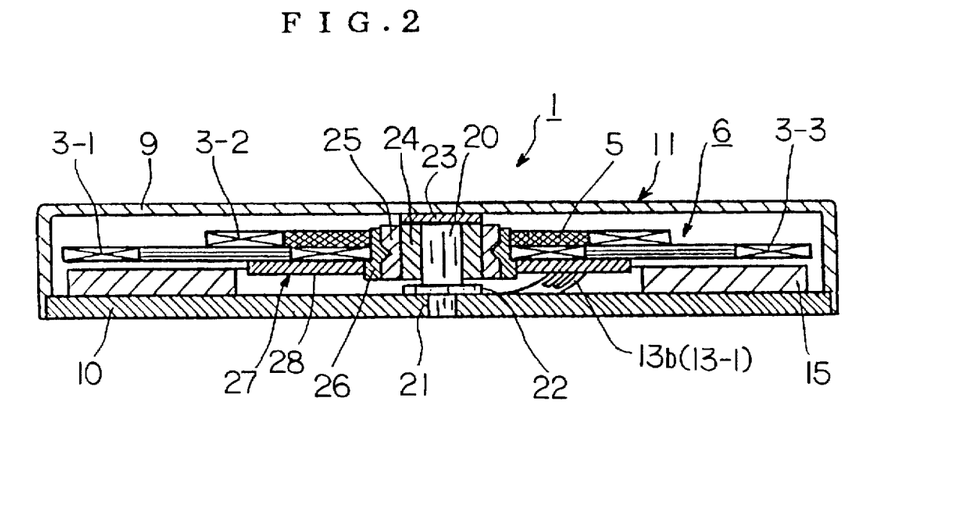
FIG. 2 is a vertical cross sectional view of the flat vibration generating apparatus according to the present invention.

In the present invention, as shown in FIGS. 1 and 2, a flat vibrator main body 11 is formed by closing the lower opening of a flat cup-like case 9 made of a magnetic substance and having a thickness of 3 mm in an axial direction and a diameter of 20 mm by a disc-like bracket 10 made of a magnetic substance. The case 9 and the bracket 10 function also as a stator yoke. The bracket 10 is produced by using an iron substrate, for example.

Figure 3:
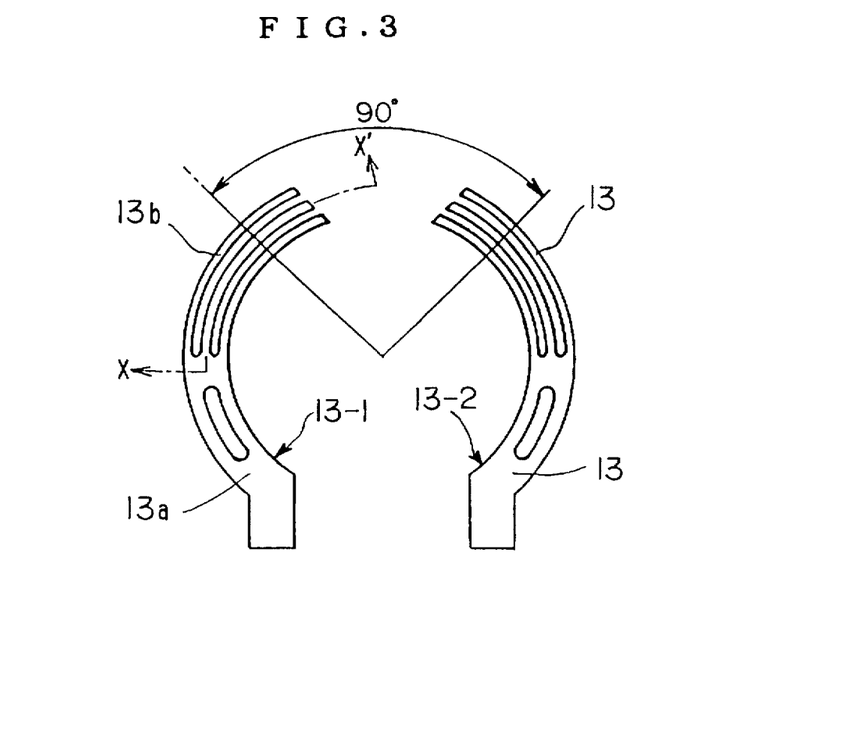
FIG. 3 is a plane view of brushes in the present invention.
Figure 4:
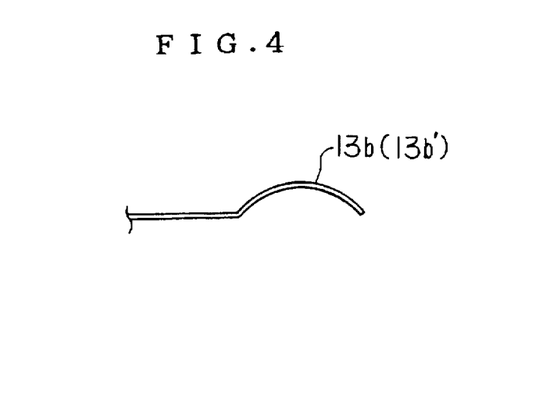
FIG. 4 is a cross sectional view taken along the line X-X' in FIG. 3.
Figure 5:
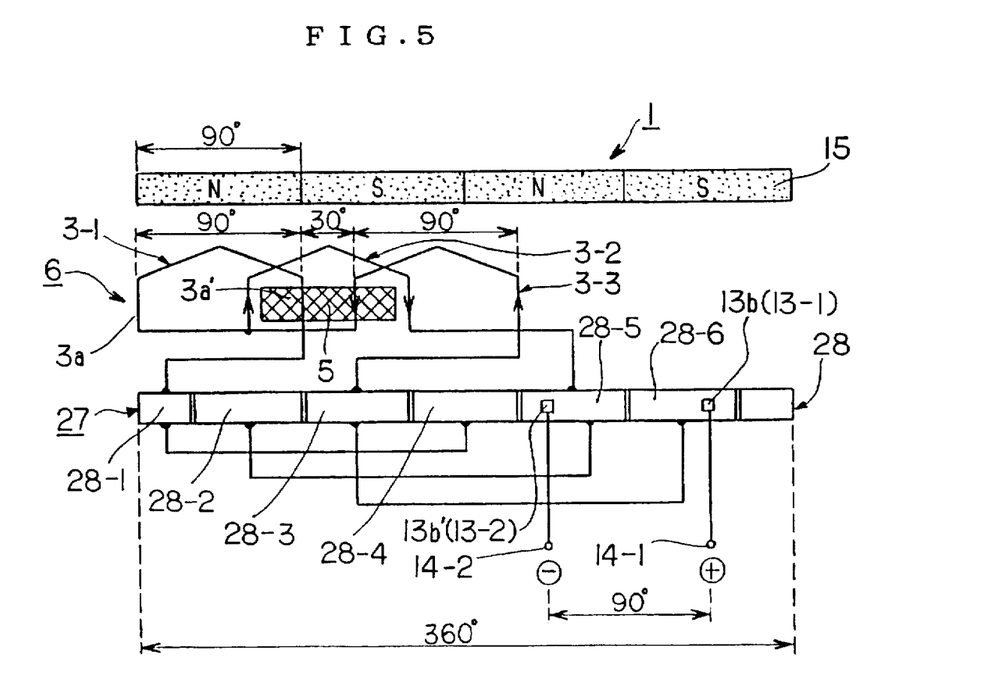
FIG. 5 is an exploded view explaining the relation between magnetic field poles, armature, commutator and brushes.
Figure 6:
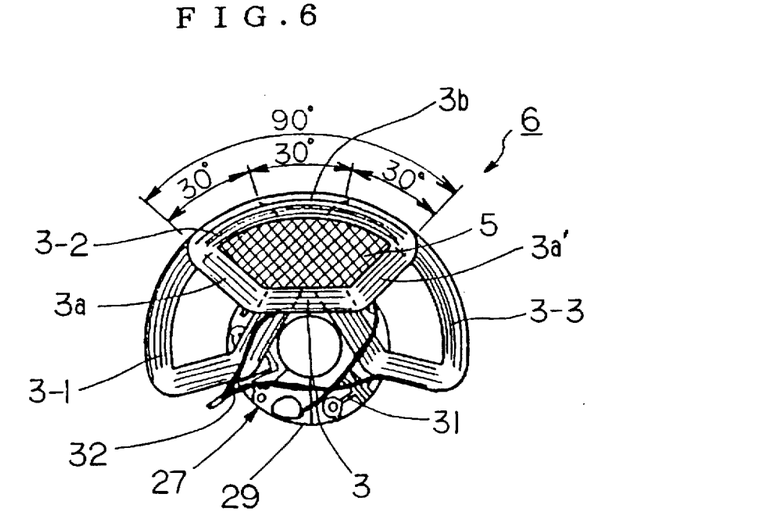
FIG. 6 is a plane view of a three-phase coreless eccentric vibrator armature in the present invention.

One end of each of power feed conductor portions 13a, 13a' of brushes 13-1, 13-2 is fixed by soldering or spot welding to the upper surface of the bracket 10 at an internal position of a field poles 15 in a substantially ring-like form. The other end of each of said power feed conductor portions 13a, 13a' forms a comb-tooth-like brush portion 13b or 13b', as shown in FIG. 3, which comes into sliding contact with a later-described commutator 28. These power feed conductor portions 13a, 13a' are electrically connected to positive and negative power supply terminals 14-1, 14-2 through power feed conductor patterns 12-1, 12-2 and power feed lead wires 18-1, 18-2, respectively, as shown in FIG. 1. Incidentally, FIG. 4 is a longitudinal sectional view of the brush portion taken along a line X-X' in FIG. 3. The brush portions 13a 13b are separated from each other by π/2, that is 90°, in angular position, as shown in FIGS. 1, 3 and 5.

A through-hole 16 is formed by cutting a side surface portion of the case 9, and the outer peripheral portion of the bracket 10 corresponding to this through-hole 16 is extended outward in a radial direction in such a manner as to form a lead wire fitting plate 17 for power feed as shown in FIG. 1. The conductor portions 13a, 13a' described above are electrically connected to the power feed lead wires 18-1, 18-2 by a solder 19 on the lead wire fitting plate 17.

The lower end portion of a stationary shaft 20 equipped with a flange 22 is pushed into, and fixed to, a through-hole 21 formed at the center of the bracket 10 until its flange 22 abuts against the bracket 10, and the upper end of the stationary shaft 20 is brought into sliding contact with the center portion of the inner surface of the case 9 through a slider 23. The stationary shaft 20 rotatably supports an armature 6 for a flat coreless eccentric vibration generating apparatus.

In other words, a cylindrical bearing 24 such as an oilless metal bearing is rotatably fitted to the outer periphery of the stationary shaft 20, and three coreless armature coils 3-1, 3-2 and 3-3 of 3-phase each having a fan frame-like flat surface for the armature 6 are bonded and fixed to a flat sheet-like commutator substrate 27. The commutator substrate 27 is fixed through a cylindrical resin mold 26 and cylindrical spacer 25 made of a non-magnetic metal to the outer periphery of the bearing 24.

Four flat disc-like magnetic field poles 15, which are produced by alternately magnetizing N and S magnetic poles in the circumferential direction are fixed by an adhesive to the upper surface of the bracket 10 in the concentric relation with a stationary shaft 20 so that the magnetic field poles 15 are faced through an air gap in the axial direction to the a coreless eccentric vibrator armature 6.

The flat coreless eccentric vibrator armature 6 of a three-phase hemi-disc type as viewed from the axial direction is formed by superposing double three air-core type armature coils 3-1, 3-2 and 3-3 with their phases deviated in the circumferential direction so that the armature 6 vibrates eccentrically when it rotates.

The armature coils 3-1, 3-2 and 3-3 have a property such that their effective conductor portions 3a, 3a' in the radial direction contribute to the resulting torque but their conductor portions 3b, 3c in the circumferential direction do not contribute to the resulting torque. In order to constitute a high efficiency, each armature coil 3-1, 3-2 or 3-3 has an open angle between the effective conductor portions 3a and 3a' which is equal to the angular interval of the magnetic field poles 15, that is to say, a fan frame shape having a mechanical angle of 90°.

Figure 8:
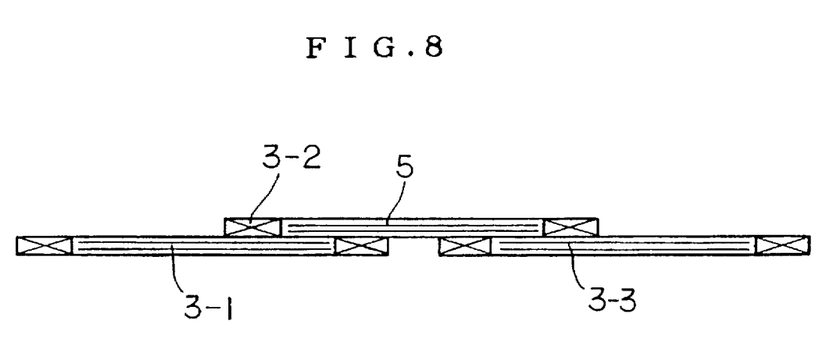
FIG. 8 is a vertical cross sectional view of armature coils in the present invention.

To obtain the thin three-phase flat coreless eccentric vibrator armature 6 having high vibration efficiency, the armature coils 3-1 and 3-3 are disposed with a space of 30° between them in the peripheral direction lest they overlap with each other, and the armature coil 3-2 is disposed in superposition on an intermediate position between the armature coils 3-1 and 3-3 so that the armature coils 3-1 and 3-2 overlap double and the armature coils 3-2 and 3-3 overlap double as shown in FIGS. 1 and 8, thereby forming a semicircular eccentric shape as viewed from the axial direction. Incidentally, even when the armature coils 3-1 and 3-2, 3-2 and 3-3 are so constituted as to overlap into a double thickness in this way, each of these armature coils 3-1, 3-2 and 3-3 can be shaped, if their wire size and the number of windings are suitably selected, to the same small thickness as that of the flat coreless eccentric vibrator armature 6' according to the prior art. Further, a greater torque can be generated.

A fan-shaped eccentric weight 5 made of a non-magnetic metal such as lead is accommodated in, and fixed to, the hollow portion inside the frame of the armature coil 3-2 at the center of the flat coreless eccentric vibrator armature 6, as shown in FIGS. 1 and 5 to 8. The eccentric weight 5 generates an eddy current when it rotates relatively to the N and S poles of the magnetic field poles 15. This eddy current provides the eccentric weight 5 with the same function as the N and S poles, and exhibits attraction and repulsion with the N and S poles of the magnetic field poles 15. Accordingly, the flat coreless eccentric vibrator armature 6 undergoes attraction and repulsion to and from the magnetic field poles 15 and rotates while causing vertical vibration. In other words, the eccentric weight 5 causes vertical vibration.

This eccentric weight 5 is used so as to increase the centrifugal force and the vibration in that direction. As described above, the eccentric weight 5 can generate the eddy current and is most suitable if it has a greater specific gravity than that of the armature coils. Lead is selected as the non-magnetic metal because it is economical and is easily available.

The eccentric weight 5 may be incorporated later into the hollow portion inside the frame of the armature coil 3-2, but an armature coil 3-2 with a built-in eccentric weight can be produced by using the eccentric weight 5 as a bobbin and winding an electric wire round the outer periphery of this eccentric weight 5 by using a winding machine.

Results of experiments reveal that the vibration, which is preferred from the aspect of body feel, as the combination of the vibration due to the centrifugal force and the vertical vibration, can be generated when the eccentric weight 5 is disposed only inside the internal frame hollow portion of the armature coil 3-2. In other words, when the flat coreless eccentric vibrator armature 6 rotates, the center of gravity comes at the portion of the armature coil 3-2. Therefore, a great vertical vibration can be obtained by placing the eccentric weight 5 into the armature coil 3-2. A desired vibration cannot be obtained when the eccentric weight 5 is put into only the armature coil 3-1 or 3-3. Since lead having a great specific gravity is selected for the eccentric weight 5, means for covering this load having the great specific gravity is necessary from the aspect of torque.

Let's consider the case where the eccentric weight 5 as the load is put into the internal frame hollow portion of the armature coil 3-1. As is obvious from the exploded view of FIG. 5, the torque by the armature coil 3-1 and the torque by the effective conductor portion 3a of the armature coil 3-2 opposing the eccentric weight 5 cover the load of this eccentric weight 5. Similarly, when the eccentric weight 5 as the load is put into the internal frame hollow portion of the armature coil 3-3, the torque by the armature coil 3-3 and the torque by the effective conductor portion 3a' of the armature coil 3-2 opposing the eccentric weight 5 cover the load of the eccentric weight 5.

However, when the eccentric weight 5 as the load is put into the internal frame hollow portion of the armature coil 3-2, the torque by the armature coil 3-2 and the torque by the effective conductor portion 3'a of the armature coil 3-1 and by the effective conductor portion 3a of the armature coil 3-3 opposing the eccentric weight 5 cover the load of the eccentric weight 5. In other words, the torque by the effective conductor portions 3a and 3a' is added and the weight of the eccentric weight 5 can be sufficiently covered. Further, the center of gravity of the armature 6 is located inside the internal frame hollow portion of the armature coil 3-2, and this position is stable from the aspect of the balance. Accordingly, the vibration which is preferred to body feel and which is the combination of the vibration due to the centrifugal force and the vertical vibration can be generated by disposing the eccentric weight 5 only inside the internal frame hollow portion of the armature coil 3-2.

Figure 7:
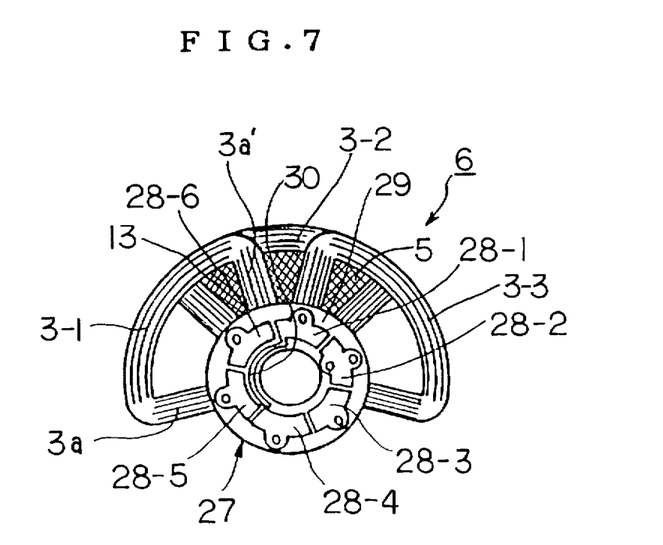
FIG. 7 is a bottom view of the three-phase coreless eccentric vibrator armature in the present invention.

A commutator substrate 27 concentrically fixed with the stationary shaft 20 to the lower surface of the flat coreless eccentric vibrator armature 6 includes an insulating substrate such as a printed board, preferably a through-hole substrate 29, as shown in FIG. 7. A commutator 28 comprising commutator plates 28-1, . . . , 28-6 is formed by etching, etc, on the lower surface of the substrate 29.

The commutator plates 28-1 and 28-4 are electrically connected by a printed wiring pattern 30 formed on the lower surface of the insulating substrate 29 by etching, and the commutator plates 28-2 and 28-5, 28-3 and 28-6 are likewise connected electrically by a printed wiring pattern 31 formed on the upper surface of the insulating substrate 29 by etching. One of the terminals of each of the armature coils 3-1, 3-2 and 3-3 is electrically connected in common. The other end of the armature coil 3-1 is electrically connected to the commutator plate 28-1, the other terminal of the armature coil 3-2 to the commutator plate 28-5, and the other terminal of the armature coil 3-3 to the commutator plate 28-3, by means such as soldering.

Incidentally, the armature coils 3-1 and 3-3 are bonded to the insulating substrate 29 by an adhesive, and the armature coil 3-2 is similarly bonded by the adhesive to the upper surfaces of the armature coils 3-1, 3-2 so as to form the three-phase flat coreless eccentric vibrator armature 6.

Therefore, even when winding start terminals 32 of the armature coils 3-1 and 3-3 are soldered to a printed wiring pattern 31 of the upper surface of the insulating substrate 29 while being extended along the upper surfaces of the armature coils 3-1 and 3-3, the winding start terminals 32 do not become an obstacle because the armature coil 3-2 exists on the upper surfaces of the armature coils 3-1 and 3-3 and because a space is defined between the case 9 and the upper surface of the flat coreless eccentric vibrator armature 6 by a thickness corresponding to the thickness of the armature coil 3-2.

Further, in the flat coreless, eccentric vibrator armature 6 described above, winding start terminal 32 inside the armature coil 3-2 on the remote side having a larger distance from the magnetic field poles 15 is connected commutator plates 28-5 of the commutator substrate 27 and the printed wiring pattern 31 by directly passing through the one near side having a shorter distance from the magnetic field poles 15 in the axial direction.

Therefore, the winding start terminal 32 do not become an obstacle because the armature coil 3-2 exists on the upper surfaces of the armature coils 3-1 and 3-3 and because a space is defined between the case 9 and the upper surface of the flat coreless eccentric vibrator armature 6 by a thickness corresponding to the thickness of the armature coil 3-2.

In the flat vibration generating apparatus 1 according to the present invention, when power is supplied as shown in FIG. 5 from the power supply of the battery of the pager incorporating therein to the three armature coils 3-1, 3-2 and 3-3 (through the power terminals 14-1, 14-2, the power supply lead wires 18-1, 18-2, the power supply conductor patterns 12-1, 12-2, the brush portions 13b, 13b', the commutator 28, etc.) in such a manner as to obtain the rotary torque in a suitable direction, a rotary torque in a predetermined direction is generated in accordance with the Fleming's lefthand rule, so that the flat coreless eccentric vibrator armature 6 rotates in the predetermined direction.

When the flat coreless eccentric vibrator armature 6 rotates in the predetermined direction, the sliding positions of the brush portions 13b and 13b' on the commutator plates 28-1, . . . , 28-6 change over so as to obtain sequentially the rotary torques in the predetermined direction, and in this way, the continuous rotary torque in the predetermined direction is generated. Here, because the flat coreless eccentric vibrator armature 6 is shaped into the eccentric shape, it rotates eccentrically while partly exhibiting the circular motion. The vibration in the radial and circumferential directions resulting from the eccentric rotation of this eccentric vibrator armature 6 and the vertical vibration resulting from the attraction and repulsion operations by the eccentric weight 5 and the magnetic field poles 15 propagate to the eccentric vibrator main body 11.

Accordingly, vibrations propagate to the apparatus having fitted thereto the flat vibration generating apparatus 1, such as the pager main body, and the pager notifies the user of the call by the vibration.

Incidentally, in order to make the flat coreless eccentric vibrator armature 6 rigid, the portions other than the special portion such as the commutator 28, etc. may be molded by a resin.

According to the flat vibration generating apparatus of the present invention, a winding design of the armature coil capable of providing a large torque and high efficiency can be employed. Therefore, even when the armature coils overlap several folds, the armature coils can be constituted into a thickness equal to, or smaller than, the thickness of the flat coreless eccentric vibrator armature according to the prior art and moreover, insufficiency of the vertical vibration desirable from the aspect of body feel can be compensated for.

Moreover, because a structure having high design freedom can be employed, a metal capable of generating the eddy current can be disposed at the centroid at which the greatest centrifugal force is generated. Accordingly, the vibration by the centrifugal force can be generated in the same way as in the prior art vibrators and, in addition, the vertical vibration which is desirable from the aspect of body feel can be generated by the metal capable of generating the eddy current. Therefore, the flat vibration generating apparatus according to the present invention is suitable for a card type pager, and so forth.

According to the flat vibration generating apparatus of the present invention, the flat coreless eccentric vibrator armature revolves round the outer periphery of the stationary shaft by merely passing the bearing provided to the flat coreless eccentric vibration generating apparatus over the outer periphery of the stationary shaft the apex of which is brought into contact with the slider. Therefore, the tolerance of fitting between the outer periphery of the stationary shaft and the inner periphery of the bearing provided to the flat coreless eccentric vibrator armature rotating around this outer periphery can be mitigated. In other words, even when the tolerance of fitting between the outer diameter of the stationary shaft and the inner diameter of the bearing does not coincide with a predetermined value, the flat coreless eccentric vibrator armature can rotate round the outer periphery of the stationary shaft while exhibiting eccentric vibration. As a result, adjustment of coaxiality and concentricity of the bearing and its sizing are not necessary, and a thin, flat vibration generating apparatus having no protruding shaft, which is highly stable, and which is extremely thin in the axial direction can be produced easily and economically.

Obviously, many modifications and variations of the present invention are possible in light of the above teachings. It therefore is to be understood that within the scope of the appended claims, the present invention may be practiced otherwise than as specifically described herein.

What is claimed is:

1. A flat vibration generating apparatus comprising:
   a stator having four magnetic field poles disposed in such a manner that adjacent poles have different polarities,
   a plurality of brushes,
   a three-phase flat coreless eccentric vibrator armature consisting of three air-core type armature coils facing the magnetic field poles through a gap in the axial direction and rotating eccentrically with respect to an axial centerline of said stator, and
   a commutator electrically connected to the armature, wherein
   said three air-core type armature coils include a first coil, a second coil spaced circumferentially from the first coil, and a third coil superposed on the first and second coils in such a manner that the phases of the coils are deviated from one another in a circumferential direction of said armature so as to form an arrangement which is eccentric with respect to an axial centerline of said stator and so as not form a complete disc-like shape as viewed from the axial direction.

2. The flat vibration generating apparatus as claimed in claim 1, wherein the armature coils comprise a center armature coil flanked by two end armature coils, and further comprising an eccentric weight disposed inside a frame of the center armature coil, the eccentric weight generating an eddy current by its rotation relative to the magnetic field poles.

3. The flat vibration generating apparatus as claimed in claim 1, wherein one of the armature coils is located axially near one of the magnetic field poles and another of the armature coils is located axially remote from the magnetic field pole, and further comprising a winding start terminal disposed inside the armature coil located axially remote from the magnetic field pole, the winding start terminal being connected electrically to the commutator by passing axially along the armature coil located axially near the magnetic field pole.

4. The flat vibration generating apparatus as claimed in claim 1, wherein the armature coils comprise a center armature coil flanked by two end armature coils, wherein one of the armature coils is located axially near one of the magnetic field poles and another of the armature coils is located axially remote from the magnetic field pole, and further comprising 1) an eccentric weight disposed inside a frame of the center armature coil, the eccentric weight generating an eddy current by its rotation relative to the magnetic field poles, and 2) a winding start terminal disposed inside the armature coil located axially remote from the magnetic field pole the winding start terminal being connected electrically to the commutator by passing along the other armature coil located axially near the magnetic field pole.

5. The flat vibration generating apparatus as claimed in claim 1, wherein the flat coreless eccentric vibrator armature further comprises a flat vibrator main body which includes a) a cup-shaped case having an inner surface and an open end portion and b) a bracket which closes the open end portion, wherein a through-hole is bored at the substantial center of the bracket, and further comprising 1) a slider which is disposed on the inner surface of the case and 2) a stationary shaft which is received in the through-hole and which has an apex, the apex of the stationary shaft contacting the slider, and wherein the flat coreless eccentric vibrator armature is disposed rotatably inside the flat vibrator main body.

6. The flat vibration generating apparatus as claimed in claim 1, wherein the armature coils comprise a center armature coil flanked by two end armature coils, and wherein the flat coreless eccentric vibrator armature further comprises a flat vibrator main body which includes a) a cup-shaped case having an inner surface and an open end portion and b) a bracket which closes the open end portion, wherein a through-hole is bored at the substantial center of the bracket, and further comprising 1) an eccentric weight disposed inside a frame of the center armature coil, the eccentric weight generating an eddy current by its rotation relative to the magnetic field poles, 2) a slider which is disposed on the inner surface of the case and 3) a stationary shaft which is received in the through-hole and which has an apex, the apex of the stationary shaft contacting the slider, and wherein the flat coreless eccentric vibrator armature is disposed rotatably inside the flat vibrator main body.

7. A flat vibration generating apparatus comprising:

a stator having four magnetic field poles disposed in such a manner that adjacent poles have different polarities, a plurality of brushes, a three-phase flat coreless eccentric vibrator armature including exactly three air-core type armature coils facing the magnetic field poles through an axial gap and rotating eccentrically with respect to an axial centerline of said apparatus, wherein said three air-core type armature coils include a first coil, a second coil spaced circumferentially from the first coil, and a third coil superposed on the first and second coils so that the phases of the coils are deviated from one another in a circumferential direction of said armature so as to form an arrangement which is eccentric with respect to the axial centerline of said stator and so as not form a complete circle when viewed from the axial direction of the armature, and a commutator electrically connected to the armature.

8. A flat vibration generating apparatus comprising:

a stator having four magnetic field poles disposed in such a manner that adjacent poles have different polarities, a plurality of brushes, a three-phase flat coreless eccentric vibrator armature including exactly three air-core type armature coils facing the magnetic field poles through an axial gap and rotating eccentrically with respect to an axial centerline of said apparatus, wherein said three air-core type armature coils include a center coil and two end coils flanking said center coil such that said center coil is superposed on said two end coils so that their phases are deviated from one another in a circumferential direction of said armature so as to form an arrangement which is eccentric with respect to the axial centerline of said stator and so as not form a complete circle when viewed from the axial direction of the armature, an eccentric weight disposed inside said center coil and generating an eddy current by its rotation relative to said magnetic field poles, and a commutator electrically connected to the armature.

* * * * *